United States Patent
Adams et al.

(10) Patent No.: US 9,568,117 B2
(45) Date of Patent: Feb. 14, 2017

(54) COMBINATION DIAPHRAGM PISTON ACTUATOR

(71) Applicant: GE Oil & Gas Pressure Control LP, Houston, TX (US)

(72) Inventors: Keith M. Adams, Katy, TX (US); Lloyd R. Cheatham, Lake Jackson, TX (US); Travis Kyle McEvoy, Houston, TX (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 0 days.

(21) Appl. No.: 14/673,178

(22) Filed: Mar. 30, 2015

(65) Prior Publication Data
US 2015/0204456 A1 Jul. 23, 2015

Related U.S. Application Data

(63) Continuation-in-part of application No. 13/679,553, filed on Nov. 16, 2012, now Pat. No. 8,998,166, and a
(Continued)

(51) Int. Cl.
*F16K 31/12* (2006.01)
*F16K 31/126* (2006.01)
(Continued)

(52) U.S. Cl.
CPC .......... *F16K 31/1262* (2013.01); *F15B 15/10* (2013.01); *F15B 15/1447* (2013.01);
(Continued)

(58) Field of Classification Search
CPC ... F15B 15/10; F15B 15/1438; F15B 15/1457; Y10T 137/3631; Y10T 137/8158; Y10T 137/8225; F16K 31/1262; F16K 37/0008; F16K 37/0016
(Continued)

(56) References Cited

U.S. PATENT DOCUMENTS 2,610,820 A 9/1952 Markel
2,953,166 A 9/1960 Carlson, Jr.
(Continued)

FOREIGN PATENT DOCUMENTS

CN 2121592 U 11/1992
CN 1748087 A 3/2006
(Continued)

OTHER PUBLICATIONS

Non-Final Rejection towards related U.S. Appl. No. 13/832,884 dated Feb. 17, 2015.
(Continued)

*Primary Examiner* — Matthew W Jellett
(74) *Attorney, Agent, or Firm* — Hogan Lovells US LLP

(57) ABSTRACT

An apparatus for actuating a valve includes an actuator with a cap. A plate that engages the inner diameter of the actuator housing is positioned within the actuator housing. A pressure chamber is located within the actuator housing between the plate and cap. A cap seal fluidly seals the pressure chamber between the cap and the actuator housing. The pressure chamber is fluidly sealed at the plate by one of a first plate seal assembly and a second plate seal assembly. The first plate seal assembly is formed by the diaphragm being secured between a seal nut and the plate. The second plate seal assembly is formed by an outer diameter sidewall seal located between the inner diameter of the actuator housing and the outer diameter of the plate and a retainer seal located between an outer diameter of the seal nut and an inner diameter of the plate.

19 Claims, 10 Drawing Sheets

Related U.S. Application Data continuation-in-part of application No. 14/107,589, filed on Dec. 16, 2013, now Pat. No. 8,991,420, application No. 14/673,178, which is a continuation-in-part of application No. 13/832,884, filed on Mar. 15, 2013.

(60) Provisional application No. 62/049,539, filed on Sep. 12, 2014, provisional application No. 61/747,753, filed on Dec. 31, 2012, provisional application No. 61/747,479, filed on Dec. 31, 2012.

(51) Int. Cl.
| | |
|---|---|
| *F15B 15/10* | (2006.01) |
| *F15B 15/14* | (2006.01) |
| *F16K 31/122* | (2006.01) |
| *F15B 20/00* | (2006.01) |
| *F15B 21/00* | (2006.01) |

(52) U.S. Cl.
CPC ...... *F15B 15/1457* (2013.01); *F16K 31/1221* (2013.01); *F15B 20/00* (2013.01); *F15B 21/003* (2013.01); *F15B 2211/864* (2013.01); *F15B 2211/8757* (2013.01)

(58) Field of Classification Search
USPC .................. 251/61–63.6, 291; 137/551, 553
See application file for complete search history.

(56) References Cited

U.S. PATENT DOCUMENTS

| | | | |
|---|---|---|---|
| 3,082,792 A | 3/1963 | Jenkins | |
| 3,115,068 A * | 12/1963 | Lofink | 91/517 |
| 3,139,898 A | 7/1964 | Wiltgen | |
| 3,146,682 A | 9/1964 | Price et al. | |
| 3,175,473 A | 3/1965 | Boteler et al. | |
| 3,293,992 A | 12/1966 | Baumann | |
| 3,380,470 A | 4/1968 | Culpepper, Jr. et al. | |
| 3,593,959 A | 7/1971 | Greene | |
| 3,792,717 A | 2/1974 | Tibbals | |
| 3,811,457 A * | 5/1974 | Crossman | B60C 23/0496 |
| | | | 137/226 |
| 3,881,400 A * | 5/1975 | Lewis, Sr. | 92/52 |
| 3,882,400 A | 5/1975 | Hamada | |
| 3,958,592 A | 5/1976 | Wells | |
| 3,993,284 A | 11/1976 | Lukens | |
| 4,135,546 A | 1/1979 | Morrison | |
| 4,135,547 A | 1/1979 | Akkerman | |
| 4,187,764 A | 2/1980 | Cho | |
| 4,274,432 A | 6/1981 | Tunstall et al. | |
| 4,309,022 A | 1/1982 | Reinicke et al. | |
| 4,354,425 A * | 10/1982 | Bruton et al. | 92/94 |
| 4,424,738 A * | 1/1984 | Leighton | 91/422 |
| 4,480,811 A | 11/1984 | Card | |
| 4,489,756 A | 12/1984 | Balz | |
| 4,491,060 A | 1/1985 | Boski | |
| 4,527,769 A | 7/1985 | Stogner | |
| 4,529,330 A * | 7/1985 | Boski | 403/2 |
| 4,585,207 A | 4/1986 | Shelton | |
| 4,620,562 A | 11/1986 | Pacht | |
| 4,624,442 A | 11/1986 | Duffy et al. | |
| 4,633,898 A | 1/1987 | Denk | |
| 4,650,151 A | 3/1987 | McIntyre | |
| 4,721,284 A | 1/1988 | Bankard | |
| 4,768,545 A | 9/1988 | Hoffman | |
| 4,871,143 A | 10/1989 | Baker | |
| 4,934,403 A | 6/1990 | Mooney et al. | |
| 4,967,785 A | 11/1990 | Young | |
| 5,067,392 A | 11/1991 | Gautier | |
| 5,294,090 A | 3/1994 | Winnike | |
| 5,464,040 A | 11/1995 | Johnson | |
| 5,499,648 A | 3/1996 | Powell et al. | |
| 5,964,446 A | 10/1999 | Walton et al. | |
| 6,015,134 A | 1/2000 | Johnson | |
| 6,050,541 A | 4/2000 | Chatufale | |
| 6,086,039 A * | 7/2000 | Sievers et al. | 251/61.5 |
| 6,089,531 A | 7/2000 | Young | |
| 6,397,892 B1 | 6/2002 | Pyle et al. | |
| 6,487,960 B1 | 12/2002 | Chatufale | |
| 6,672,331 B2 | 1/2004 | Heald | |
| 6,854,704 B1 | 2/2005 | Young | |
| 7,124,774 B2 | 10/2006 | Weingarten | |
| 7,159,839 B2 * | 1/2007 | Tanikawa | F16K 31/165 |
| | | | 251/63 |
| 7,647,861 B2 | 1/2010 | Bessman | |
| 8,282,070 B2 | 10/2012 | Davies, Jr. | |
| 8,322,359 B2 | 12/2012 | Zecchi et al. | |
| 8,708,309 B2 | 4/2014 | Roper et al. | |
| 8,864,102 B2 * | 10/2014 | Gamache | F16K 31/126 |
| | | | 251/61.2 |
| 9,033,308 B2 | 5/2015 | Kiesbauer et al. | |
| 9,212,758 B2 | 12/2015 | Adams et al. | |
| 2003/0034465 A1 | 2/2003 | Adams et al. | |
| 2004/0007682 A1 | 1/2004 | Kajitani | |
| 2004/0154467 A1 | 8/2004 | Engle et al. | |
| 2005/0087712 A1 | 4/2005 | Lymberopoulos | |
| 2007/0290154 A1 | 12/2007 | Aoyama et al. | |
| 2011/0240126 A1 | 10/2011 | Lymberopoulos et al. | |
| 2012/0227983 A1 | 9/2012 | Lymberopoulos et al. | |
| 2012/0318388 A1 | 12/2012 | Du | |
| 2014/0138564 A1 | 5/2014 | Adams et al. | |
| 2014/0174554 A1 | 6/2014 | Meyberg et al. | |
| 2015/0204456 A1 | 7/2015 | Adams et al. | |

FOREIGN PATENT DOCUMENTS

| | | |
|---|---|---|
| CN | 101093034 A | 12/2007 |
| CN | 202302237 U | 7/2012 |
| CN | 202432085 U | 9/2012 |
| DE | 102011015646 A1 | 10/2012 |
| EP | 0486824 A | 5/1992 |
| FR | 1195213 A | 11/1959 |
| GB | 1148817 A | 4/1969 |
| GB | 2022704 A | 12/1979 |
| GB | 2168787 A | 6/1986 |
| GB | 2303199 A | 2/1997 |
| JP | 20080069795 A | 3/2008 |
| JP | 2010048271 A | 3/2010 |
| WO | 2014099505 A1 | 6/2014 |

OTHER PUBLICATIONS

International Search Report and Written Opinion issued in connection with related PCT Application No. PCT/US2013/067666, dated Mar. 3, 2014.

International Search Report and Written Opinion issued in connection with related PCT Application No. PCT/US2013/077392, dated Mar. 7, 2014.

International Search Report and Written Opinion issued in connection with related PCT Application No. PCT/US2013/077412, dated Mar. 7, 2014.

Final Rejection towards related U.S. Appl. No. 13/832,884 dated May 27, 2015.

International Search Report and Written Opinion issued in connection with corresponding PCT Application No. PCT/US2015/049556, dated Nov. 19, 2015.

Unofficial English Translation of Office Action and Search Report issued in connection with related CN Application No. 201380070284.5 on May 25, 2016.

Unofficial English Translation of Office Action and Search Report issued in connection with related CN Application No. 201380074076.2 on Jun. 30, 2016.

Unofficial English Translation of Office Action and Search Report issued in connection with related CN Application No. 201380070678.0 on Jul. 5, 2016.

Actuators Pressure Control CHA Top Access Standard Hydraulic Actuator, GE Oil & Gas, 2013.

Dec. 5, 2016, International Search Report and Written Opinion issued in connection with related PCT Application No. PCT/US2013/074223 dated Apr. 3, 2014.

(56) References Cited

OTHER PUBLICATIONS

Non-Final Rejection in related U.S. Appl. No. 13/717,073 dated Jul. 31, 2014.
Actuators NoBolt™ Dual Seal Pneumatic Actuator, GE Oil & Gas, 2015.
Office Action issued in connection with corresponding CN Application No. 201380073191.8 on Jul. 5, 2016 (English translation provided).
U.S. Appl. No. 14/949,324, filed Nov. 23, 2015, McEvoy et al.
U.S. Appl. No. 62/172,544, filed Jun. 8, 2015, McEvoy et al.
U.S. Appl. No. 15/175,122, filed Jun. 7, 2016, McEvoy et al.
U.S. Appl. No. 61/747,479, filed Dec. 31, 2012, Adams et al.
U.S. Appl. No. 13/832,884, filed Mar. 15, 2013, Adams et al.
U.S. Appl. No. 13/679,553, filed Nov. 16, 2012, Adams et al.
U.S. Appl. No. 61/747,753, filed Dec. 31, 2012, Adams et al.
U.S. Appl. No. 14/107,589, filed Dec. 16, 2013, Adams et al.
U.S. Appl. No. 62/049,539, filed Sep. 12, 2014, Cheatham et al.
U.S. Appl. No. 13/717,073, filed Dec. 17, 2012, Adams et al.

* cited by examiner

COMBINATION DIAPHRAGM PISTON ACTUATOR

CROSS REFERENCE TO RELATED APPLICATIONS

This application claims priority to and the benefit of U.S. Provisional Application No. 62/049,539, titled "Non Tension Diaphragm," filed Sep. 12, 2014, the full disclosure of which is hereby incorporated by reference herein in its entirety.

This application also is a continuation-in-part of and claims priority to and the benefit of: U.S. patent application Ser. No. 13/679,553, now U.S. Pat. No. 8,998,166, titled "Combination Diaphragm Piston Actuator," filed Nov. 16, 2012; U.S. patent application Ser. No. 14/107,589, now U.S. Pat. No. 8,991,420, titled "Non-Rising Stem Actuator," which claims priority to and the benefit of U.S. Provisional Patent Application No. 61/747,753 filed Dec. 31, 2012; and U.S. patent application Ser. No. 13/832,884, titled "Quick Connect Valve Actuator," which claims priority to and the benefit of U.S. Provisional Patent Application No. 61/747,479, titled "Quick Connect Valve Actuator," filed Dec. 31, 2012, the full disclosure of each which are incorporated herein by reference in its entirety.

BACKGROUND OF THE DISCLOSURE

1. Field of the Disclosure

The present disclosure relates in general to valves for mineral recovery wells, and in particular to actuators to actuate valves.

2. Description of Related Art

A gate valve is a valve having a body and a bore through the body. A gate is positioned transverse to the body, and moves linearly to obstruct flow through the bore or allow flow through the bore. Some gates have an aperture that aligns with the bore to allow flow. The gate can be normally open, and thus the gate is closed when it is moved linearly to push the aperture out of alignment with the bore. Alternatively, a gate can be normally closed, and thus the gate is opened when it is moved linearly to position the aperture in alignment with the bore. Regardless of whether the gate is normally open or normally closed, the gate is moved, or actuated, by a valve actuator.

Actuators can be a hydraulic, piston type actuator, or actuators can be a pneumatic piston or diaphragm type actuator. In conventional diaphragm actuators, a diaphragm is moved in response to pressure media, such as gas or other fluids, urging the diaphragm toward the gate valve. The diaphragm is supported by a support plate. When the diaphragm is urged downward with the pressure media, it urges the support plate downward, which then transfers the downward force via a stem to the gate of the gate valve to open or close the gate valve, as applicable.

In some current diaphragm actuators, the outer diameter of the diaphragm support plate does not extend to the inner diameter of the housing in which the diaphragm is positioned so that a portion of the diaphragm hangs over the edge of the support plate and is thus unsupported. As one of skill in the art will appreciate, unsupported regions of a diaphragm are more prone to failure and require a thick and reinforced diaphragm to be able to withstand the force exerted by the pressure media.

In some actuators, an indicator stem protrudes through the cap of the housing of a typical valve actuator. The indicator stem is part of a sealing nut assembly that extends upward from the plate inside the valve actuator housing, or is threadingly connected to the top surface of the plate. The indicator stem sealing nut sealingly engages a bore of the plate. Leaks can occur between the indicator stem sealing nut and the plate. In pneumatic type actuators having a diaphragm, the sealing nut must be removed to replace the diaphragm.

In some cases, the actuator can be manually actuated by pressing against the indicator stem. The force on the stem, however, can damage the stem or internal components of the actuator. It is desirable to be able to externally actuate the valve without exerting forces on the stem that can damage the actuator. It is also desirable to be able to remove and replace the stem without breaking seals between the sealing nut and the plate or diaphragm.

SUMMARY OF THE DISCLOSURE

This application discloses embodiments of a valve actuator that is alternatively configurable for use as a diaphragm actuator, a piston actuator, or a dual or combination diaphragm and piston actuator. In various embodiments, the actuator includes modular components that are usable in one or more modes of use of the actuator; that can be exchanged for differently sized or configured components; and/or that can interface with differently sized or configured components. Embodiments herein provide significant performance, manufacturing, assembly, cost, and other advantages, such as described below.

More specifically, in an embodiment, the valve actuator is a pneumatic valve actuator usable to actuate valves, such as gate valves. The valve actuator is configurable to use a diaphragm; or piston pressure; or both a diaphragm and piston pressure. Embodiments herein allow the manufacture of common actuator parts that can be used in multiple pneumatic actuator applications. Additionally, embodiments provide an operator with flexibility to use a diaphragm, a piston, or a dual seal actuator to actuate a valve.

Alternate systems and methods of this current disclosure provide a non-rising stem diaphragm or piston actuator. Such embodiments do not have a top shaft that protrudes through the cap of the actuator. An indicator shaft is instead provided that protrudes from a non-pressure containing portion of the actuator, reducing the risk of seal failures. In addition, systems and methods of the current disclosure include an indicator shaft that can limit removal of the actuator while the actuator is pressurized with pressure media.

The diaphragm of embodiments of this disclosure will resist undesirable wear during use, resulting in an extended useful life of the diaphragm. The diaphragm can resist wear, for example, by being fully supported within the actuator, by extending and contracting during the actuation process without being exposed to sufficient tension to balloon or stretch the diaphragm, and by having additional material in regions of concern for potential failure.

In an embodiment of the current disclosure, an apparatus for actuating a valve includes an actuator housing having a valve end, a cap end, and a sidewall defining an inner diameter of the actuator housing. A cap is connected to the cap end of the actuator housing. A plate is positioned within the actuator housing, the plate having a center portion and an outer diameter that slidingly engages the inner diameter of the actuator housing. A pressure chamber is located within the actuator housing between the plate and the cap, the plate moving between an extended position and a retracted position in response to pressure media injected into the pressure chamber. The plate is nearer the valve end in the extended position than in the refracted position. A seal nut is connected to the plate, the seal nut operable to engage a central opening of a diaphragm. A cap seal fluidly seals the pressure chamber between the cap and the actuator housing. The pressure chamber is fluidly sealed at the plate by one of the first plate seal assembly and the second plate seal assembly. The first plate seal assembly formed by the diaphragm being secured between the seal nut and the plate. The second plate seal assembly is formed by an outer diameter sidewall seal located between the inner diameter of the actuator housing and the outer diameter of the plate and a retainer seal located between an outer diameter of the seal nut and an inner diameter of the plate.

In an alternate embodiment of the current disclosure, an apparatus for actuating a valve includes an actuator housing having a valve end, a cap end, and a sidewall defining an inner diameter of the actuator housing. A cap is connected to the cap end of the actuator housing. A plate is positioned within the actuator housing, the plate having a center portion and an outer diameter that slidingly engages the inner diameter of the actuator housing. A first pressure chamber and second pressure chamber are located within the actuator housing between the plate and the cap. The first pressure chamber includes a diaphragm supported by the plate. The second pressure chamber is defined by the plate, the actuator housing, and the cap, the second pressure chamber having a plate seal assembly including an outer diameter sidewall seal located between the inner diameter of the actuator housing and the outer diameter of the plate. A fluidly sealed region between the cap and the plate is formed by at least one of the first pressure chamber and the second pressure chamber and the plate moves between a plate-up position and a plate-down position in response to pressure media injected into the fluidly sealed region, the plate being nearer the valve end in the plate-down position than in the plate-up position.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE DISCLOSURE

The system and method of the present disclosure will now be described more fully hereinafter with reference to the accompanying drawings which illustrate embodiments of the invention. The system and method if this disclosure may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
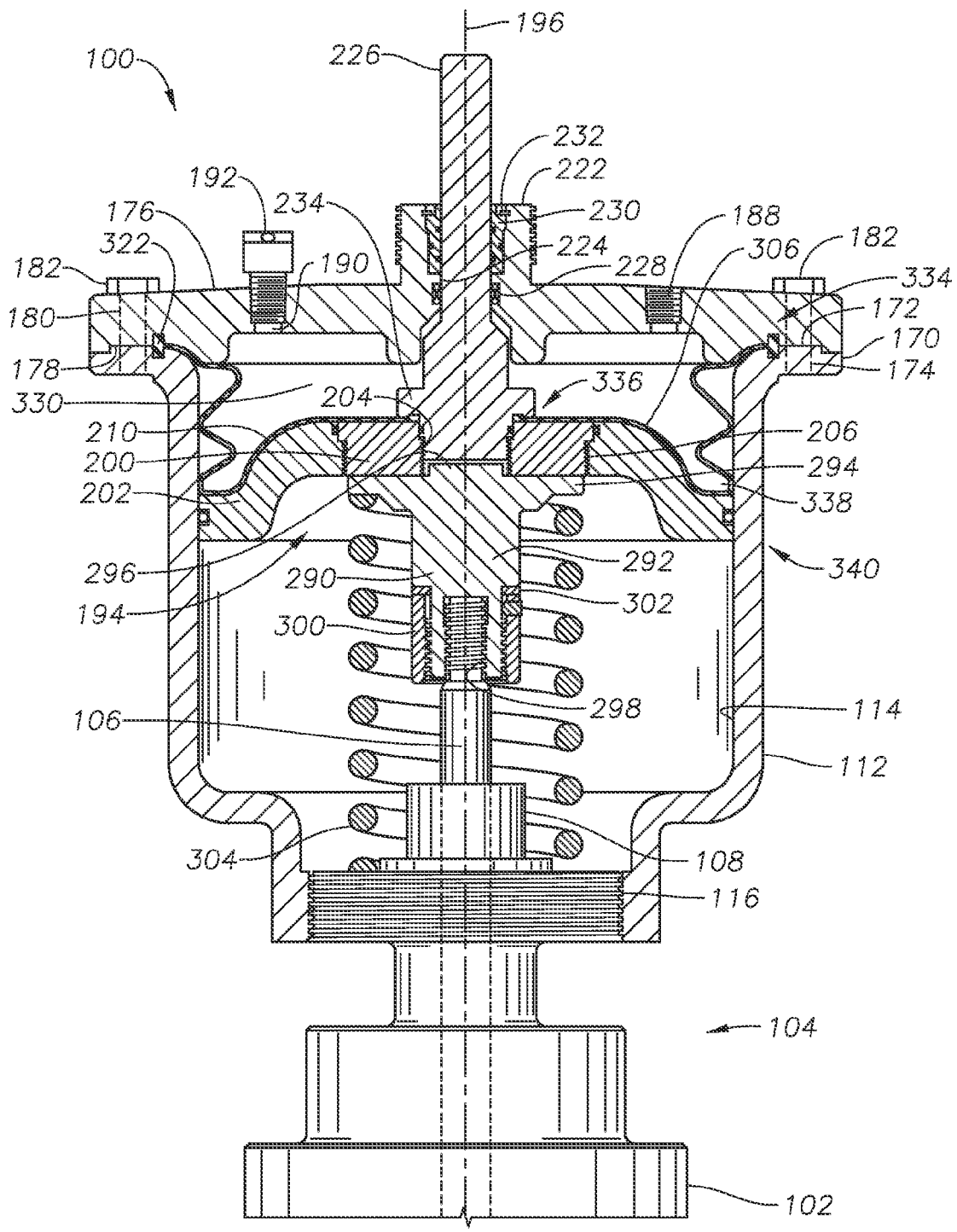
FIG. 1 is a side sectional view of an embodiment of a dual seal piston diaphragm actuator in accordance with an embodiment of this disclosure, showing the plate in a plate-up position.

Referring to FIG. 1, actuator 100 is shown. Actuator 100 is used to open or close valve 102, to which actuator 100 is connected. As one of skill in the art will appreciate, valve 102 can be a gate valve or any other type of valve that is actuated by the extension of a linear member. Valve 102 can be, for example associated with a wellhead assembly that is disposed over a well. The wellhead assembly can include a wellhead housing, a production tree over the housing and flow lines connected to the tree or the wellhead assembly. The flow lines and wellhead assembly can include embodiments of valve 102 described herein. Valve 102 can also be used for regulating fluids that are designated for entry into the wellhead assembly. Valve 102 can be used in low temperature or otherwise harsh environments. Bonnet 104 is connected to the body of valve 102. Valve stem 106 passes through bonnet 104 and packing retainer 108. Actuator 100 is used to actuate valve 102 by urging valve stem 106 downward toward valve 102. Bonnet 104 and valve 102 are sealed to prevent the flow of fluid from valve 102 to actuator 100.

Actuator housing 112 includes a cylindrical body having an inner diameter surface 114. Housing 112 is manufactured from any of a variety of techniques including, for example, stamping, extrusion, and casting. In embodiments, housing 112 is free of welds or seams on interior surfaces such as inner diameter surface 114. Housing 112 can be manufactured from NACE certified materials.

In the embodiment of FIG. 1, a valve end of actuator housing 112 is connected to bonnet 104 by way of threads 116. In an alternate embodiment of FIGS. 7-8A, the valve end of actuator housing 112 is connected to bonnet 104 by way of bonnet connector 118. The lower end of housing 112 includes an opening defined by connector inner diameter 120. Housing lugs 122 protrude inward from connector inner diameter 120 and are spaced apart around connector inner diameter 120 to define housing slots 124 therebetween.

Figure 7:
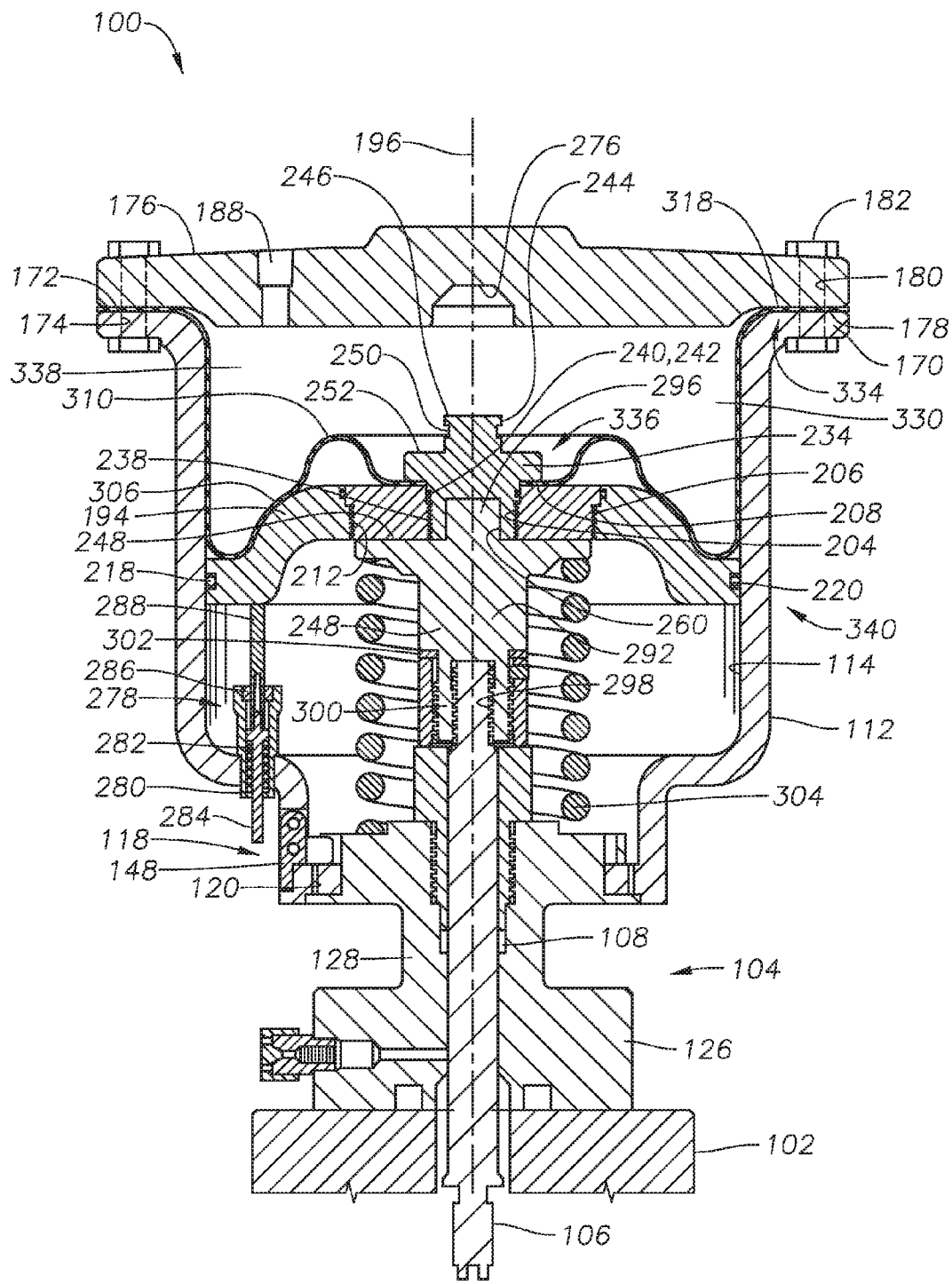
FIG. 7 is a side sectional view of a dual seal piston diaphragm actuator with a non-rising stem in accordance with an embodiment of this disclosure, shown in the plate-down position.
Figure 8A:
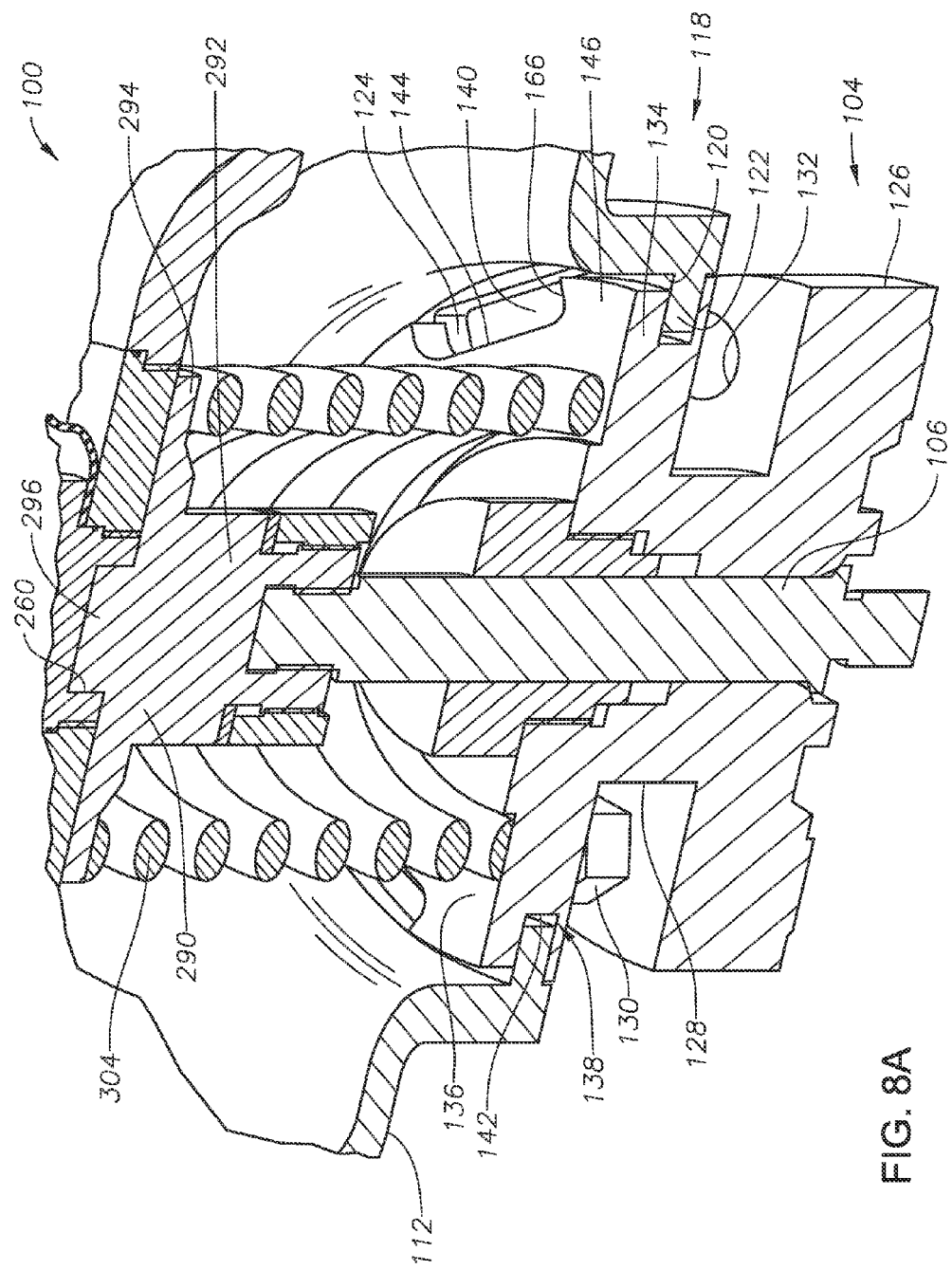
FIG. 8A is an enlarged side sectional view of the quick connect of the dual seal piston diaphragm actuator of FIG. 7.

Still looking at FIGS. 7-8A, bonnet 104 includes lower flange 126 extending radially from bonnet body 128. Lower flange 126 includes bolt holes 132. Bolts 130 can pass through bolt holes 132 to connect bonnet 104 to the body of valve 102. At the opposite end of bonnet 104 from lower flange 126, locking flange 134 extends radially from bonnet body 128 and includes top surface 136. The outer diameter of locking flange 134 is less than or about equal to connector inner diameter 120 so that connector inner diameter 120 can fit over locking flange 134.

Groove 138 is an annular groove in the outer diameter of locking flange 134. The lower sidewall of groove 138 defines upward facing shoulder 140. The width of groove 138, which is defined in terms of axial length along the axis of bonnet 104, is greater than or about equal to the axial length of housing lugs 122. The diameter of groove back wall 142 is less than or about equal to the inner diameter defined by housing lugs 122 so that housing lugs 122 can fit within groove 138.

Slots 144 are axial slots in the outer diameter of locking flange 134 that extend from top surface 136 to groove 138. A plurality of slots 144 are spaced apart around the circumference of locking flange 134 to define bonnet lugs 146 therebetween. The radial depth of each slot 144 is typically less than or equal to the radial depth of groove 138, but can alternately be greater than the radial depth of groove 138. The circumferential arc length of each slot 144 is approximately equal to or greater than the circumferential arc length of each housing lug 122. Housing lugs 122, thus, are able to pass axially through slots 144.

After passing through slots 144, housing lugs 122 are positioned in groove 138 below bonnet lugs 146, but not axially aligned with bonnet lugs 146, when housing 112 is in a released position. Housing lugs 122 contact shoulder 140, thus stopping further downward movement of housing 112 relative to bonnet 104. Because housing lugs 122 are axially below bonnet lugs 146, housing 112 can rotate relative to bonnet 104. When housing 112 rotates, relative to bonnet 104, to a position wherein bonnet lugs 146 are axially above housing lugs 122, housing 112 is in a locked position. In the locked position, bonnet lugs 146 prevent upward axial movement of housing lugs 118. In embodiments, less than one revolution of housing 112 is required to move housing 112 from the released to the locked position. In certain embodiments, housing 112 can move as little as ½, ⅓, ¼, ⅙, ⅛, ⅒, or ¹⁄₁₆, of a revolution, depending on the size and number of lugs, to move from the released to the locked position.

As one of skill in the art will appreciate, no fluid from valve 102 is in the vicinity of bonnet lugs 146 and housing lugs 122 and, thus, there can be an absence of seals between the lower end of housing 112 and the upper end of bonnet 104. Therefore, in embodiments, if any fluid is present inside the lower end of housing 112, at least a portion of that fluid can pass through the opening defined by connector inner diameter 120 and flow to the area outside of housing 112 and outside of bonnet 104. In embodiments, actuator housing 112 can be removed from bonnet 104 while fluid is present in valve 102 and no fluid will flow out of valve 102 through bonnet 104 or otherwise. In other alternate embodiments, other types of connectors can be used including, for example, bolts.

Figure 8B:
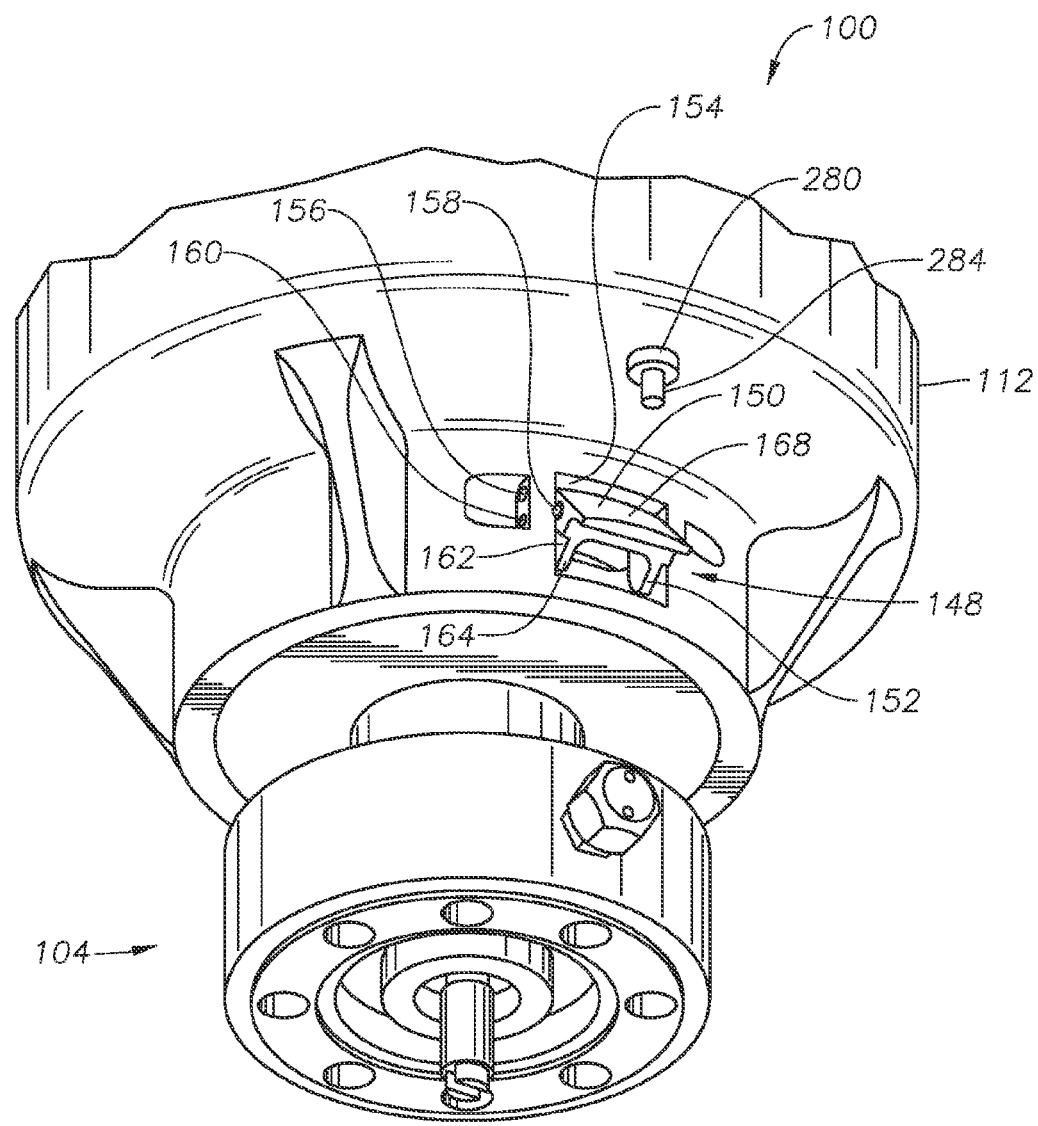
FIG. 8B is a perspective view of a rotational lock system of the dual seal piston diaphragm actuator of FIG. 7.

Referring to FIG. 8B, a rotational lock 148 can prevent rotation of housing 112, relative to bonnet 104, when housing 112 is in the locked position. Rotational lock 148 includes a latch body 150 having one or more latch tabs 152 protruding inward therefrom when latch body is positioned in latch aperture 154. Latch aperture 154 is an opening through the sidewall of housing 112. In embodiments, no seals are required at aperture 154 because there is an absence of pressurized fluid in housing 112 proximate to aperture 155. Indeed, in embodiments, there is an absence of seals between aperture 154 and latch body 150. Latch body 150 is pivotally connected to housing 112 by pin 156, which passes through a lateral bore, or cross-drilled hole, of housing 112. Latch body 150 pivots on pin 156 between an unlatched position and a latched position. Detent 158 is a spring loaded plunger that protrudes from one or both sides of latch body 150. Detent 158 engages lateral bore 160 of housing 112 to selectively prevent latch body 150 from pivoting relative to housing 112. When latch body 150 is pivoted radially outward from housing 112, in the unlatched position, detent 158 contacts an outer diameter surface of housing 112 to prevent latch body 150 from pivoting inward to the latched position. As one of skill in the art will appreciate, other mechanisms can be used to hold latch body 150 in place.

Latch tab 152 also includes tab sidewalls 162. Latch tab 152 is positioned in housing 112 slightly above housing lugs 122, such that at least a portion of latch tab 152 is in the same axial location as bonnet lugs 146 when housing 112 is landed on bonnet 104.

In embodiments, a spring (not shown) can bias latch body 150 radially inward. A portion of latch tab 152, such as bottom 164, contacts a top edge of bonnet lug 146 (FIG. 8A) when housing 112 is placed on bonnet 104, thus deflecting latch tab 152 radially outward. An edge of bottom 164 can have a taper to facilitate such deflection. With latch tab 152 positioned radially outward from housing 112, in the unlatched position, housing lugs 122 land on shoulder 140 and housing 112 is rotated to the locked position. Detent 158 holds latch tab 152 in the radially outward, unlatched position. An operator then depresses detent 158 to allow latch tab 152 to pivot inward to the latched position.

When latch tab 152 pivots to a position where detent 158 is aligned with lateral bore 160, a portion of detent 158 is urged by the internal spring (not shown) into lateral bore 160. In this latched position, detent 158 engages lateral bore 160 to hold latch tab 152 in the latched position and thus prevent latch tab 152 from moving to the unlatched position. In the latched position, latch tab sidewalls 162 engage the sidewalls 166 of bonnet lugs 146, thus preventing further rotation of housing 112 in either direction relative to bonnet 104. The outer surface 168 of latch tab 152 can be contoured with a radius that generally matches the outer diameter profile of housing 112. Alternatively, the outer surface 168 of latch tab 152 can be planar. Other types of rotational lock 148 can be used. For example, a pin (not shown) can be inserted through an aperture (not shown) of housing 112 into a bore (not shown) of bonnet 104. Or a different type of latch mechanism can be used.

Looking again at FIG. 1, a cap end of housing 112 is at the opposite end of housing 112, from bonnet connector 118. A housing flange 170 is located at the cap end of housing 112. Housing flange 170 flares outward from housing 112. Housing flange 170 has an upward facing surface 172, which is a smooth surface for forming a seal. A plurality of bolt holes 174 can be spaced part around flange 170.

Cap 176 is connected to housing 112. Cap 176 is an annular plate having an outer diameter approximately equal to the outer diameter of housing flange 170. Downward facing surface 178 is a generally smooth, downward facing surface of cap 176 that aligns with upward facing surface 172 of housing flange 170. A plurality of bolt holes 180 are spaced apart around cap 176 to align with bolt holes 174. Cap bolts 182 are passed through bolt holes 174 and bolt holes 180 and are secured with nuts. Other configurations can be used to secure cap 176 to housing 112, such as bolts that are inserted through bolt holes 174 to threadingly engage bolt holes 180 to secure cap 176 to housing 112 (not shown), bolts that are inserted through bolt holes 180 to threadingly engage bolt holes 174 (not shown), clamps (not shown), collars (not shown), or a bayonet mount (not shown). As an example, in the alternate embodiment of FIG. 4, instead of bolt holes 174, 180 and cap bolts 182, a series of cap tabs 184 and housing tabs 186 that interact so that cap 176 can be located on actuator housing 112 and then cap 176 can be rotated from a released position to a locked position by rotating cap 176 less than one full revolution between the released and locked positions.

Inlet 188 is an orifice through cap 176 and is spaced inwardly from downward facing surface 178. Inlet 188 is connected to a pressurized media fluid source (not shown) that can selectively provide pressurized media fluid through inlet 188. Pressurized media is typically a fluid such as compressed air, nitrogen, well gas, or other types of gas or liquid. As one of skill in the art will appreciate, in embodiments, additional orifices can be used and can be connected to tubing or pressure relief devices. As an example, orifice 190 is a second opening through cap 176. Device 192, shown in orifice 190, can be a pressure relief device that will open to relieve pressure in housing 112 should the pressure exceed a predetermined value. As one of skill in the art will appreciate, device 192 could be one of a variety of devices to relieve an overpressure situation, such as a pressure relief valve, a rupture disk, or a controlled valve. Alternately, device 192 can be a sealant injection port for selectively directing sealant into actuator housing 112.

Figure 2:
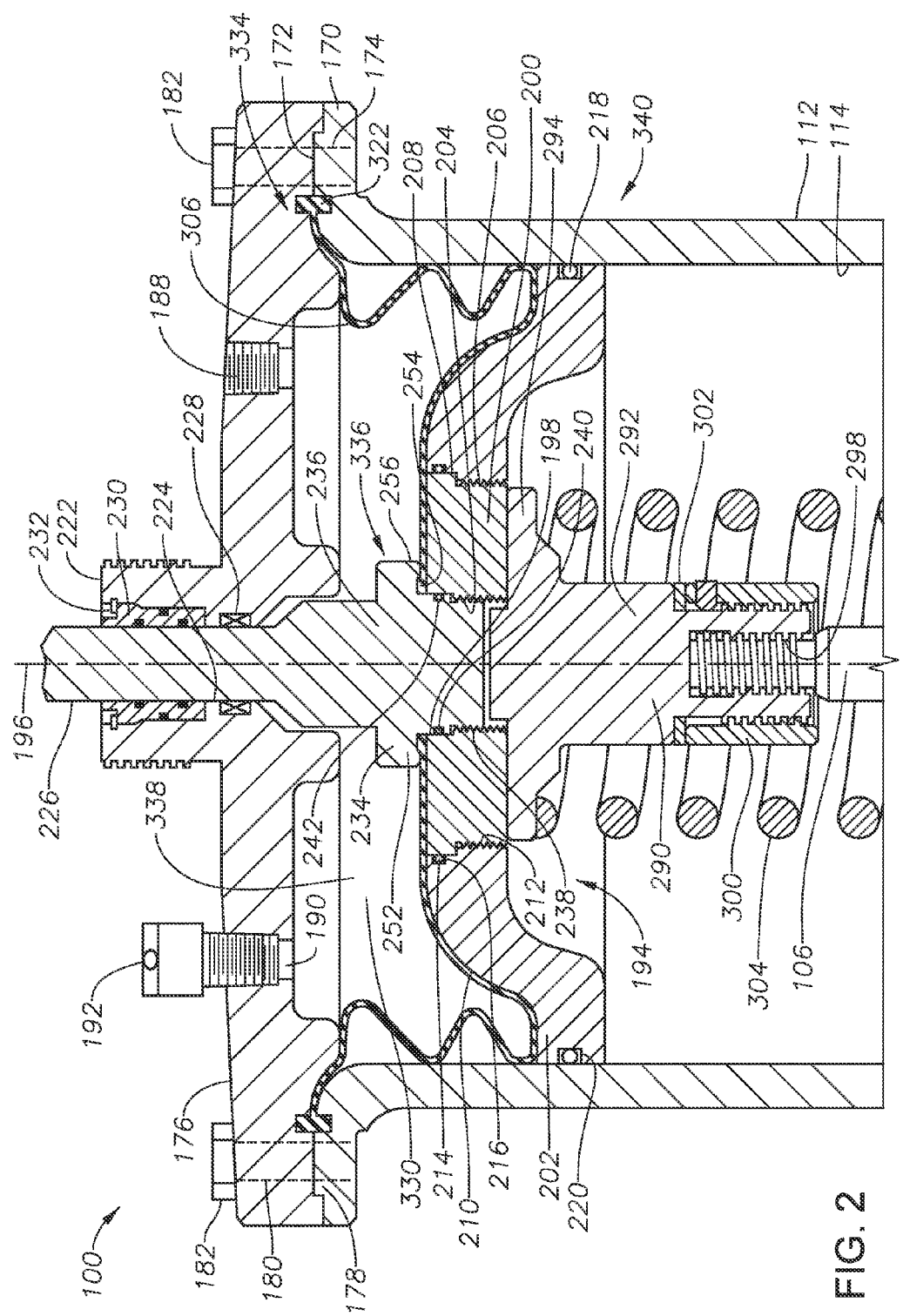
FIG. 2 is an enlarged detail view of the dual seal piston diaphragm actuator of FIG. 1.

Turning to FIG. 2, plate 194 is an annular plate positioned in housing 112. Plate 194 is generally perpendicular to the central axis 196 of housing 112. Plate 194 can span the inner diameter of housing 112 and slidingly or sealingly engage the inner diameter surface 114 of housing 112. Plate 194 includes a central bore 198. The upward facing surface of plate 194 is the pressure side of plate 194. Plate 194 can be a single, monolithic plate (FIG. 4), or can include hub 200 and outer plate 202. Central bore 198, has inner diameter threads 204 on the inner diameter surface. In embodiments including hub 200, hub 200 has the central bore 198. Hub 200 also includes a sealing surface on an inner diameter of central bore 198. The outer diameter of hub 200 includes outer diameter threads 206 and outer diameter sealing surface 208.

Outer plate 202 is an annular ring that connects to hub 200, such that plate 194 includes outer plate 202 and hub 200. Upper surface 210 of outer plate 202 (or plate 194 if there is no outer plate 202) slopes downward and outward, with a generally convex shape, and then extends horizontally to inner diameter surface 114. In other embodiments, the upper surface 210 of outer plate 202 can slope upward and outward before extending horizontally to inner diameter surface 114, or can be a flat surface, or can have an alternative shape of a combination sloped and flat portions. The surface of plate 194 can have a contour such that the radially outward portions are axially below the radially inward portions, or such that the radially outward portions are axially above the radially inward portions (not shown). In other embodiments, the surface of plate 194 can be flat. As shown in FIG. 1, the outer diameter region of the plate is located axially nearer the valve end of the housing than the central portion of the plate. In embodiments, plate 194 has an upward facing convex surface and an upward facing concave surface. The concave surface can be spaced radially outward from the convex surface or alternatively, radially inward from the convex surface. In other embodiments, plate 194 can have a generally flat surface or can have a combination of contoured convex, concave, or flat portions.

The inner diameter bore of outer plate 202 includes inner diameter threads 212 for threadingly engaging outer diameter threads 206 of hub 200. Retainer seal 214 is positioned in seal groove 216 on the bore of outer plate 202, and sealingly engages outer diameter sealing surface 208 of hub 200. Sidewall seal 218 is positioned in groove 220 located on an outer diameter of outer plate 202, and thus is located on an outer diameter of plate 194. Sidewall seal 218 sealingly engages inner diameter surface 114 of housing 112 to provide a dynamic seal between inner diameter surface 114 and plate 194. In embodiments, a wear ring (not shown) can be positioned in groove 220. As one of skill in the art will appreciate, a wear ring will reduce the friction between the outer diameter of plate 194 and inner diameter surface 114 of housing 112. The wear ring does not have the same sealing properties as sidewall seal 218.

Indicator housing 222 is a housing that includes indicator orifice 224 for receiving indicator stem 226. Indicator stem 226 is a cylindrical shaft that protrudes through cap 176. Bearing 228 is a bearing surface on an inner diameter of indicator orifice 224 for guiding indicator stem 226. Sealing assembly 230 is a seal that dynamically seals around indicator stem 226. As one of skill in the art will appreciate, sealing assembly 230 can include a snap ring 232, or other retainer (not shown), to hold sealing assembly 230 in position in indicator housing 222. Alternatively, sealing assembly 230 can be a sealing cartridge, a v-shaped lip seal with an o-ring, or other types of seals for dynamically sealing around a shaft. In alternate embodiments, such as that of FIG. 7, cap 176 does not have indicator housing 222 and there is no indicator stem 226 protruding through cap 176.

Figure 6:
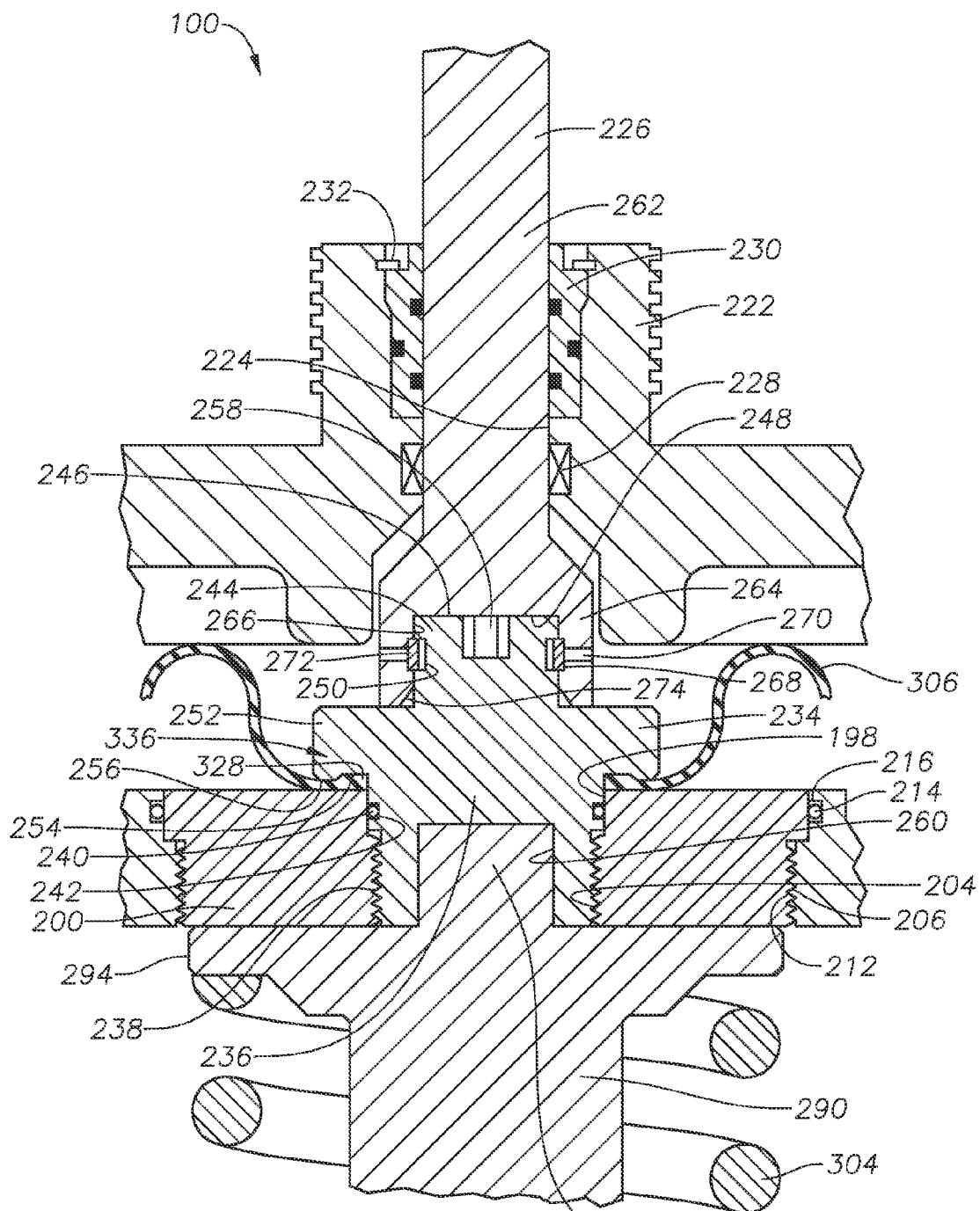
FIG. 6 is a side sectional detail view of a dual seal piston diaphragm actuator, in accordance with an embodiment of this disclosure, a swivel coupling.

Looking at FIGS. 2 and 6, seal nut 234 is detachably connected to the center of plate 194. Seal nut 234 includes a cylindrical body 236. Threads 238 are on an outer diameter of body 236, and threadingly engage the inner diameter threads 204 of hub 200. Seal nut 234 includes a seal 240, positioned in a seal groove 242 on an outer diameter surface of body 236 axially above threads 238, to sealingly engage central bore 198 of hub 200. Alternatively, there can be an absence of seals between body 236 and the inner diameter of plate 194.

In the example embodiment of FIG. 2, seal nut 234 is integrally formed with indicator stem 226. In the example embodiment of FIG. 6, indicator stem 226 is a separate member and is releasably secured to seal nut 234. In such an embodiment, upper body 244 is a cylindrical portion of seal nut 234 on the end opposite of seal nut 234 than threads 238. Upper body 244 has an end surface 246. End surface 246 can be proximate to or engage an inner surface 248 of cap 176 when plate 194 is in an upper position. A radial lock ring groove 250 can be located on an outer diameter of upper body 244.

Looking at FIGS. 2 and 6, shoulder 252 is a shoulder that extends radially from an outer diameter of body 236 of seal nut 234. Shoulder 252 is located axially above seal groove 242. The outer diameter of shoulder 252 is greater than the inner diameter of bore 198 so that shoulder 252 radially overlaps a portion of the upward facing surface of plate 194. Shoulder 252 includes downward facing surface 254, which faces towards plate 194 when seal nut 234 is installed in plate 194. Nut lip 256 protrudes axially downward from surface 254, near the edge of shoulder 252.

In the example embodiment of FIG. 6, lock ring groove 250 is an annular groove on an outer diameter surface of upper body 244, above shoulder 252. Tool receptacle 258 is a hex shaped recess for receiving an Allen wrench, and can be located on end surface 246. Other techniques can be used for tightening seal nut 234. Bore 260 is a downward facing cylindrical recess in the lower end of body 236. Indicator stem 226 is detachably connectable to seal nut 234. Indicator stem 226 includes shaft 262 connected to a base 264. Shaft 262 is a cylindrical shaft that extends upward through cap 176 and is sealingly engaged by sealing assembly 230. Base 264 is a cylindrical base having an outer diameter that is greater than the outer diameter of shaft 262. Base recess 266 is a cylindrical bore in a lower end of base 264, opposite from shaft 262. Chamfer 274 is an inward and downward facing tapered surface at the mouth of recess 266. The inner diameter of recess 266 is greater than or approximately equal to the outer diameter of upper body 244. Base 264, thus, can be concentrically positioned on upper body 244, such that upper body 244 engages recess 266.

Groove 268 is an annular groove extending around an inner diameter surface of recess 266. Orifice 270 is an orifice extending radially through the sidewall of base 264 and intersecting the bottom of groove 268. One or more orifices 270 are spaced apart around the circumference of base 264. Lock ring 272 is a resilient lock ring that is positioned to occupy at least a portion of each of lock ring groove 250 and groove 268. Lock ring 272 can be, for example, a c-ring. In its relaxed state, lock ring 272 has an inner diameter smaller than the outer diameter of upper body 244, and an outer diameter greater than the outer diameter of upper body 244. The width of lock ring 272, which is defined as the axial length of the annular ring, is less than or approximately equal to the width of each of the grooves 250 and 268.

In an example of assembly for operation, lock ring 272 is snapped onto groove 250. Indicator stem 226 is then connected to seal nut 234 by sliding base 264 onto upper body 244. Chamfer 274 compresses lock ring 272 inward, into groove 250, as recess 266 slides onto upper body 244. When groove 268 is axially aligned with groove 250, lock ring 272 is able to expand outward and engage each of groove 250 and groove 268. Lock ring 272, thus, prevents axial movement of indicator stem 226 relative to seal nut 234. To remove indicator stem 226 from seal nut 234 a tool or tools are inserted through orifices 270 and used to compress lock ring 272 into groove 250. When lock ring 272 is compressed to the point that the outer diameter of lock ring 272 is less than the inner diameter of groove 268, indicator stem 226 can slide off of upper body 244.

In the example embodiment of FIG. 7, there is no indicator stem 226. Cap 176 includes a cap recess 276 that is centered around central axis 196 and does not extend through cap 176. End surface 246 of upper body 244 can be located within cap recess 276 when plate 194 is in the plate-up position. Seal nut 234 can still have groove 250 so that an indicator stem 226 can be added if cap 176 shown in FIG. 7 is replaced with a cap 176 that includes an indicator housing 222. In alternate embodiments, an orifice (not shown) can be located in the center of cap 176. The orifice (not shown) can be plugged with a plug (not shown) to prevent pressurized media from escaping through the orifice (not shown). In the event an operator desires to use an upward rising indicator stem that can be used, for example, to urge plate 194 downward, the plug (not shown) can be removed and an indicator stem housing (not shown) can be inserted into the orifice (not shown) in cap 176. An indicator stem can be connected to plate 194 such as, for example, by connecting a stem (not shown) to seal nut 234 by way of groove 250. The indicator stem housing (not shown) can slidingly and sealingly engage the stem (not shown).

Looking at the example embodiment of FIGS. 7 and 8B, instead of having indicator stem 226 to indicate the position of plate 194, indicator assembly 278 can indicate the position of plate 194. Indicator housing 280 is a cylindrical housing positioned in indicator orifice 282. Indicator orifice 282 is an opening in a downward facing surface of actuator housing 112, axially below a portion of plate 194. Indicator housing 280 has a generally cylindrical shape with a connector, such as threads, on an outer diameter surface. Indicator housing 280 also includes a cylindrical bore therethrough. An annular shoulder at the lower end of indicator housing 280, defines a reduced inner diameter.

Position indicator stem 284 is a cylindrical shaft protruding from the orifice defined by the shoulder of indicator housing 280. A rib that is an annular shoulder protruding from the outer diameter of position indicator stem 284 has an outer diameter that is about the same or slightly less than the inner diameter of the cylindrical bore of indicator housing 280, but is greater than the inner diameter of the orifice defined by the annular shoulder at the lower end of indicator housing 280. The portion of position indicator stem 284 above the rib is defined as connector end 286. Connector end 286 can be smooth, have threads, or have other features to facilitate connection to another member.

Indicator shaft 288 is a cylindrical shaft extending from position indicator stem 284 to a downward facing surface of plate 194. The downward facing surface of plate 194 is part of an indicator side of plate 194 that is opposite the pressure side of plate 194 and faces the valve end of housing 112. The upper end of indicator shaft 288 can be in contact with the downward facing surface of plate 194, but is not connected to plate 194. When the plate 194 is in the plate-up position, the upper end of indicator shaft 288 is below plate 194 and not touching plate 194.

A spring can be concentric with a portion of position indicator stem 284. The lower end of the spring is in contact with the shoulder at the lower end of indicator housing 280. The upper end of the spring is in contact with rib protruding from the outer diameter of position indicator stem 284. The spring urges position indicator stem 284 upward, which in turn urges indicator shaft 288 upward until shaft 288 contacts the downward facing surface of plate 194. When actuator 100 is actuated and plate 194 moves from the plate-up position to the plate-down position, position indicator stem 284 is urged downward by way of indicator shaft 288. Position indicator stem 284 protruding further from housing 112 in the plate-down position than in the plate-up position. When plate 194 moves back up to the plate-up position, the spring urges position indicator stem 284 upward, to the extent permitted by indicator shaft 288 in contact with plate 194.

A portion of position indicator stem 284 can be located radially outward from and axially aligned with rotational lock 148 when plate 194 is in the plate-down position and position indicator stem 284 protrudes from actuator housing 112 as shown in FIG. 7. In such a position, position indicator stem 284 prevents rotational lock 148 from moving to an unlatched position. Latch body 150 would bump into position indicator stem 284 when pivoting outward, preventing latch body 150 from being in an unlatched position. Alternately, position indicator stem 284 obstructs access to rotational lock 148 when plate 194 is not in the plate-up position.

Therefore, position indicator stem 284 can be used to prevent or deter unlatching rotational lock 148 when plate 194 is in a plate-down position. In the plate-up position, position indicator stem 284 does not prevent access to or obstruct rotational lock 148. When plate 194 is in the plate-up position, the lower end of position indicator stem 284 is axially above rotational lock 148.

Because orifice 282 is through a lower end of housing 112, orifice 282 is spaced apart from, and not in communication with, a pressure chamber of actuator 100. The lower end of housing 112, below plate 194 can, for example, be at atmospheric pressure and can have ports (not shown) to expel air as plate 194 moves downwards. Therefore, position indicator stem 284 does not create a leak path wherein pressure media can escape from actuator 100. A reduction in number of dynamic seals, or the elimination of dynamic seals, to retain pressure media in actuator 100 means that leaks are less likely to occur.

Looking at FIG. 1, down stop 290 is a cylindrical member for transmitting axial force between plate 194 and valve stem 106. Down stop 290 includes cylindrical body 292 and shoulder 294 extending therefrom. The upward facing surface of shoulder 294 contacts the downward facing surface of plate 194. Nipple 296 extends axially from the upper end of down stop 290. When actuator 100 is assembled, nipple 296 can be positioned in bore 260 (FIG. 6), thus concentrically aligning both members.

The lower end of down stop 290 includes threaded bore 298, which has threads on an inner diameter surface, for threadingly engaging a threaded end of valve stem 106. As one of skill in the art will appreciate, the connection between down stop 290 and valve stem 106 can be any of various types of connections and is not limited to threaded connections. The outer diameter of the lower end of down stop 290 includes threaded collar 300 and can include any number of spacer rings 302. Threaded collar 300 contacts another member, such as packing retainer 108, located at the lower end of housing 112, to stop the further downward travel of down stop 290. Threaded collar 300 is adjusted so that it stops downward movement, and thus valve stem 106, at the appropriate position to completely open or completely close valve 102. Spacer rings 302 can be added or removed so that an opening of the gate (not shown) of gate valve 102 is properly aligned with a passage (not shown) of gate valve 102. A set screw can be used to hold threaded collar 300 in position.

Spring 304 surrounds down stop 290 and at least a portion of valve stem 106, and generally extends from the top of bonnet 104 to the downward facing surface of shoulder 294. Spring 304 is compressed as plate 194 moves from the upper position to the lower position. When fluid pressure from inlet 188 is reduced, spring 304 urges plate 194 up, away from valve 102. As one of skill in the art will appreciate, fluid force within valve 102 can act on valve stem 106 inside of valve 102 to urge valve stem 106 upward. Spring 304 and the upward force on the valve stem 106 can work together or independently to move plate 194 up.

Figure 9A:
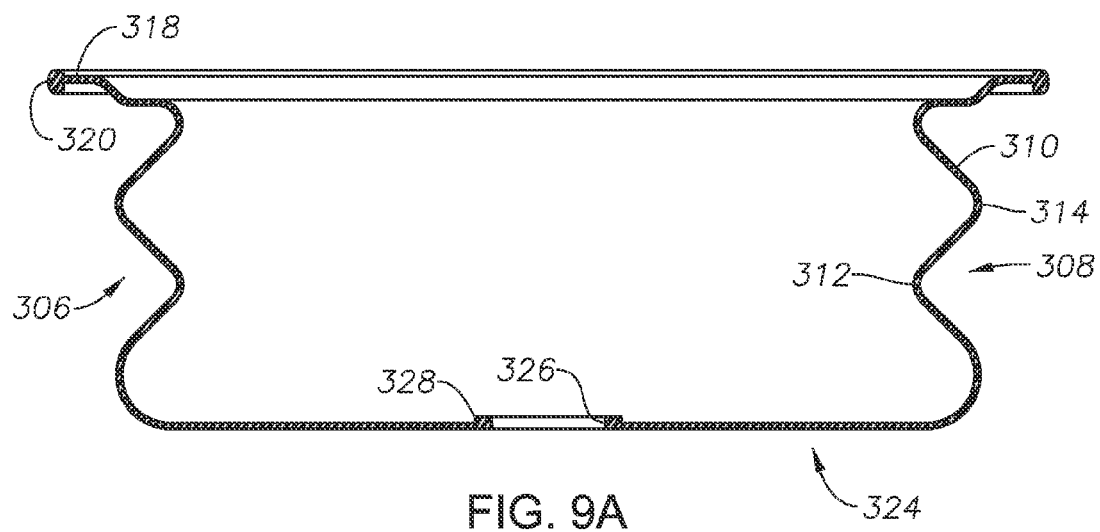
FIGS. 9A-9C are side section views of a diaphragm in accordance with an embodiment of this disclosure.
Figure 9B:
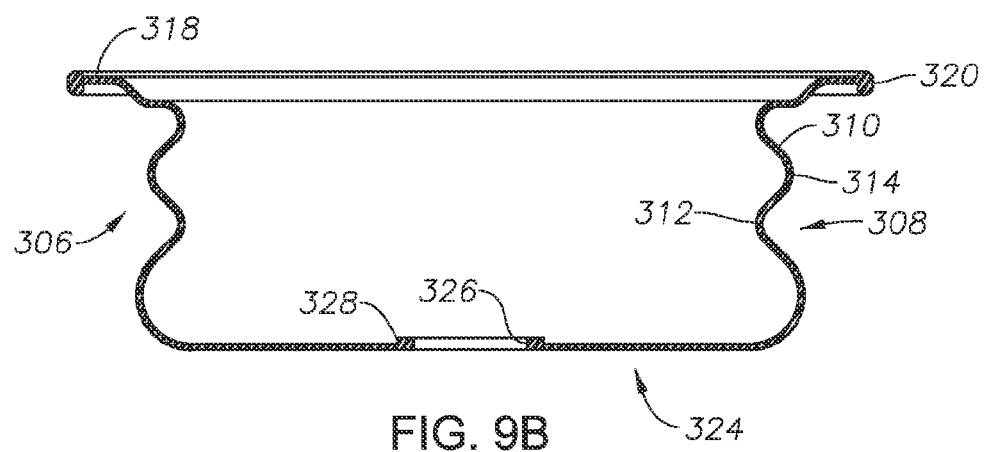
Figure 9C:
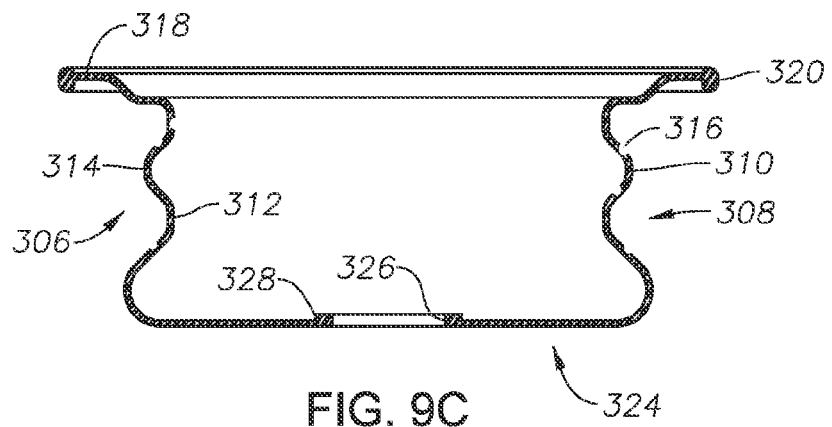

Looking at FIG. 1, diaphragm 306 is a flexible diaphragm extending at least from inner diameter surface 114 to seal nut 234. Diaphragm 306 is located between plate 194 and cap 176. Looking at FIGS. 9A-9C, diaphragm 306 has body portion 308 that consists of a generally cylindrical member with a number of folds 310. Folds 310 can be generally s-shaped (FIG. 9B), generally sideways v-shaped (FIG. 9A), generally s-shaped with flattened inner or outer loops (FIG. 9C), or have other loop shapes. Folds 310 are arranged as bellows forming inner loops 312 at an inner diameter of body portion 308 and outer loops 314 at an outer diameter of body portion 308. In the example of FIGS. 9A-9C diaphragm 306 is shown with two inner loops 312 and two outer loops 314. However, embodiments of the diaphragm 306 of this disclosure can alternately have more or less than two inner loops 312 and more or less than two outer loops 314. The number of inner and outer loops 312, 314 will depend in part on the size of actuator 100 in which diaphragm 306 will be used, with the number of inner and outer loops 312, 314 generally increasing with an increasing size of actuator 100. In alternate examples, diaphragm 306 can have, for example, zero to six inner loops 312.

Figure 3:
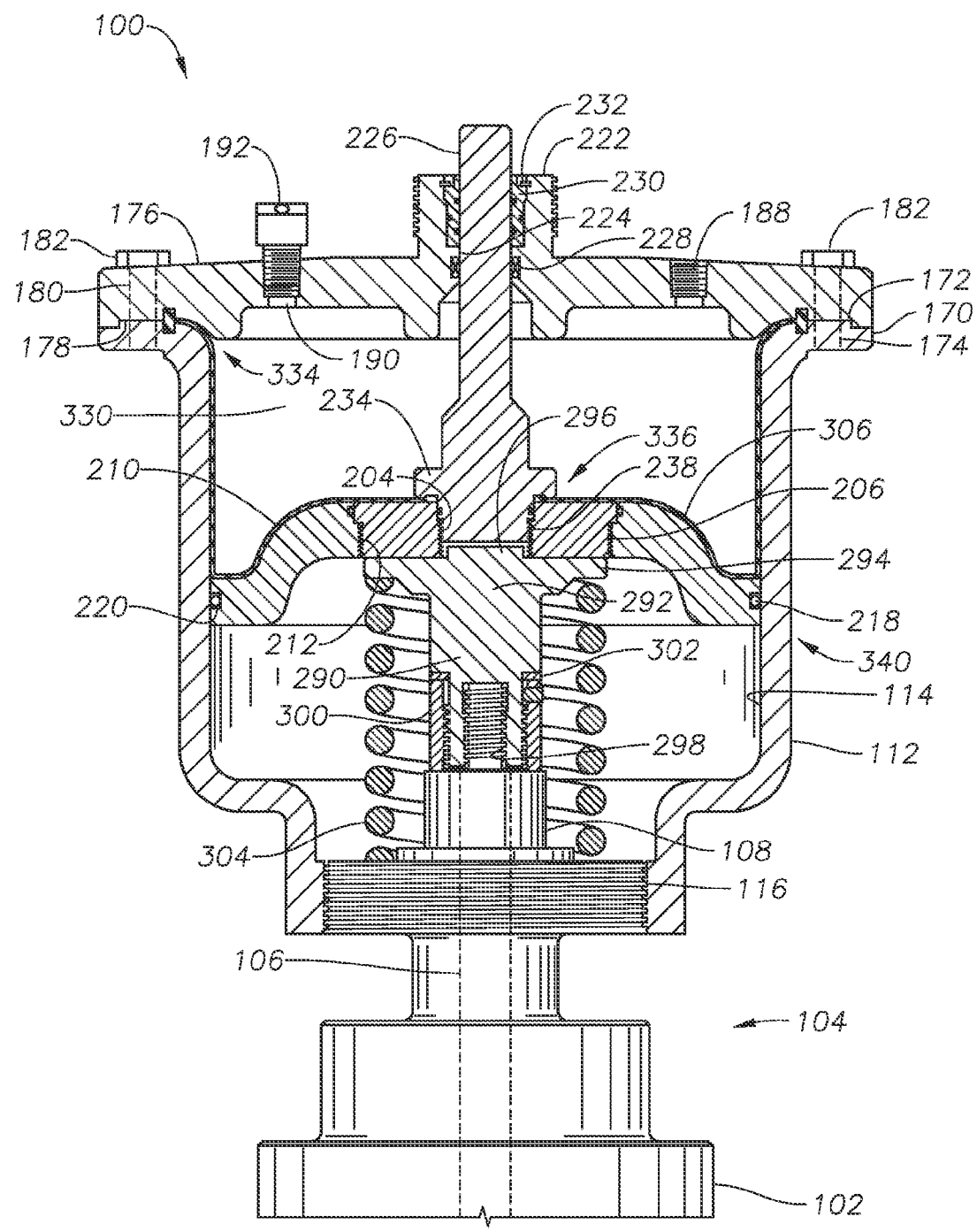
FIG. 3 is a side sectional view of the dual seal piston diaphragm actuator of FIG. 1, showing the plate in a plate-down position.

Diaphragm 306 is formed so that in a relaxed state, diaphragm 306 is shaped as shown in FIGS. 9A-9C, with folds 310 in body portion 308. Diaphragm 306 may not stretch or balloon, as plate 194 moves between a plate-up position (FIG. 1) and a plate-down position (FIG. 3). In this context, stretching and ballooning refers to conditions in which the material of diaphragm 306 would decrease in thickness, or thin, due to an increase in surface are of the material. Diaphragm 306 moves between the relaxed position (FIGS. 9A-9C) and an extended position (FIG. 3) by straightening folds 310 to expand the bellows shape of diaphragm 306 and extend and lengthen axially. After being in the extended position and returning to a relaxed position, diaphragm can shorten axially by reforming folds 310 and will reassume the shape shown in FIGS. 9A-9C. Diaphragm 306 can be formed in the shape shown in the examples of FIGS. 9A-9C, for example, by a molding process. When plate 194 is in a plate-up position, diaphragm 306 can be in a shortened position. In the shortened position, diaphragm 306 can be in a relaxed state or can be in a contracted state where the diaphragm is axially shorter than when in the relaxed position. When plate 194 is in the plate-down position, diaphragm 306 is in an extended position.

In an alternate embodiment shown in FIG. 7, diaphragm 306 can be a less rigid member so that folds 310 can be formed at any location around diaphragm 306, such as in bottom 324 of diaphragm 306. In such an embodiment, diaphragm 306 may not retain a single particular shape in a relaxed state.

In another alternate embodiment shown in FIG. 9C, body portion 308 can have dimples 316 formed on an inner surface, an outer surface, or on both the inner surface and outer surface of diaphragm 306. Dimples 316 can be spaced on the surface randomly or in a pattern. Each of the dimples 316 can be shaped, for example, as partial spheres, partial cones, or other three dimensional shapes. Dimples 316 will create an uneven surface on body portion 308 and reduce the potential for the surfaces of diaphragm 306 to stick together.

At an upper end of diaphragm 306 is top ring 318. Top ring 318 is annular shaped and extends radially outward from body portion 308. Top ring 318 extends radially outward past the outermost radial diameter of folds 310. Top ring 318 can curve downward over an inner radius of actuator housing 112 before meeting the uppermost fold 310 of body portion 308 (FIGS. 1-2).

In the example embodiments of FIGS. 9A-9C, diaphragm 306 includes seal lip 320 that is on an outer edge of top ring 318. An upper seal lip portion protrudes upward from the top of top ring 318 and a lower seal lip portion protrudes downwards from the bottom of top ring 318. Seal lip 320 can have an upper seal lip portion or a lower seal lip portion, or both an upper seal lip portion and lower seal lip portion. In the example of FIGS. 9A-9C, seal lip 320 is shown with both an upper seal lip portion and a lower seal lip portion. Seal lip 320 can be oblong, O-shaped, triangular, rectangular, or other shape in cross section. In the example of FIGS. 9A-9C, seal lip 320 is oblong in cross section with the axis of the longer dimension being generally parallel to the central axis of diaphragm 306. This oblong seal lip 320 can be compressed within a generally square shaped seal lip groove 322 in actuator 100 (FIGS. 1-2).

In certain embodiments, such as shown in FIG. 7, top ring 318 can have holes through which connecting members, such as cap bolts 182, will extend. In alternate embodiments, such as shown in FIGS. 1-2, top ring 318 can be free of holes and actuator housing 112 and cap 176 can be secured together by a connecting means that is radially outward from top ring 318.

Looking at FIGS. 9A-9C, at an end of body portion 308 opposite from top ring is bottom 324 of diaphragm 306. Bottom 324 of diaphragm 306 is generally disk shaped and extends inward from body portion 308. Bottom 324 can meet body portion 308 of diaphragm 306 at a curved transition section. In the examples of FIGS. 9A-9C, bottom 324 can be flat in a relaxed position. When located in actuator 100, bottom 324 can substantially conform to the shape of plate 194, or can remain flatter than plate 194.

Bottom 324 has central opening 326 centered on the central axis of diaphragm 306. Opening lip 328 can circumscribe central opening 326 and can include an upper opening lip that protrudes upward or a lower opening lip that protrudes downward, or both the upper opening lip and lower opening lip. The example embodiment of FIGS. 9A-9C include an upper opening lip.

Diaphragm 306 can be formed of, for example, a nitrile rubber or silicone. In regions where diaphragm 306 might undergo wear, diaphragm 306 can be supported with additional material. Such material can be the same material that forms all of diaphragm 306, or can be a supportive cloth or fabric. The additional material can be added, for example, over bottom 324 of the diaphragm, where bottom 324 meets body portion 308, where top ring 318 meets body portion 308, or along top ring 318. In this manner, a predicted point of failure can also be engineered into diaphragm 306. For example, a weak point can be designed into diaphragm 306 so that a region of diaphragm 306 that forms a seal can be maintained, even in the event of a failure of diaphragm 306. Diaphragm can be designed to fail at another, non-sealing location, such as along a center region of body portion 308. Central region of body portion 308 can remain free of additional material to increase the probability of a failure of diaphragm 306 occurring in such central region of body portion 308.

Looking at FIG. 1, actuator 100 includes pressure chamber 330 located within actuator housing 112 between plate 194 and cap 176. Pressure media injected into pressure chamber 330 will cause plate 194 to move between the retracted or plate-up position, and the extended or plate-down position (FIG. 3). In the extended position, plate 194 is nearer to the valve end of actuator 100 than when plate 194 is in the retracted position.

A number of seals can prevent pressure media from escaping from pressure chamber 330. Cap seal 334 can fluidly seal pressure chamber 330 between cap 176 and actuator housing 112. Cap seal 334 can include an outer diameter portion of diaphragm 306 located between upward facing surface 172 of housing flange 170 and downward facing surface 178 of cap 176. Sandwiching a portion of diaphragm 306 between actuator housing 112 and cap 176 can both retain diaphragm 306 in position and form cap seal 334. In the example embodiments of FIGS. 1-3, cap seal 334 is formed by seal lip 320 engaging seal lip groove 322. Seal lip groove 322 is a circumferential recess defined between upward facing surface 172 of housing flange 170 and downward facing surface 178 of cap 176. A portion of seal lip groove 322 can be formed in housing flange 170 and a portion of seal lip groove 322 can be formed in cap 176. In alternate embodiments, seal lip groove 322 can be formed entirely in one of housing flange 170 or cap 176. Seal lip groove can be triangular, oblong, square in cross section, or can have an alternate cross sectional shape. Seal lip 320 can be compressed within seal lip grove 322.

In alternate example embodiments, such as shown in FIG. 7, seal lip 320 and seal lip groove 322 can be absent and cap seal can be formed by positioning top ring 318 between upward facing surface 172 of housing flange 170 and downward facing surface 178 of cap 176. Cap bolts 182 can be torqued to urge both upward facing surface 172 of housing flange 170 and downward facing surface 178 of cap 176 toward diaphragm 306. Diaphragm 306 sealingly engages both upward facing surface 172 of housing flange 170 and downward facing surface 178 of cap 176 to form cap seal 334.

A plate seal assembly seals the other leak paths in pressure chamber 330. The plate seal assembly can be first plate seal assembly 336 that is formed by diaphragm 306 being secured between seal nut 234 and plate 194. Looking at FIG. 6, first plate seal assembly 336 can be formed by nut lip 256 trapping opening lip 328. Central opening 326 can accommodate the lower portion of seal nut 234. Seal nut 234 passes through central opening 326 so that seal nut threads 238 can engage inner diameter threads 204 of plate 194. Bore 260 of seal nut 234 can engage nipple 296 of down stop 290. As seal nut 234 is threaded into plate 194, nut lip 256 can trap opening lip 328 to form first plate seal assembly 336 and to retain diaphragm 306 in position by resisting radial movement of diaphragm 306 relative to plate 194.

In alternate embodiments, such as shown in FIG. 7, the bottom surface of diaphragm is free of opening lip 328. The bottom surface of diaphragm 306 circumscribing central opening 326 is positioned between shoulder 252 of seal nut 234 and plate 194. An upward facing surface of plate 194 sealingly engages a lower surface of diaphragm 306, and the downward facing surface of shoulder 252 sealingly engages an upper surface of diaphragm 306. As seal nut 234 is tightened toward plate 194, diaphragm 306 is compressed between plate 194 and shoulder 252.

In yet other alternate embodiments, seal nut 234 does not extend through bottom 324 of diaphragm 306, and diaphragm 306 may not have a central opening.

Looking at FIG. 1, when diaphragm 306 is in position and both cap seal 334 and first plate seal assembly 336 are fluidly sealing, pressure chamber 330 is defined by diaphragm 306, seal nut 234, and cap 176, defining a first pressure chamber 338. In one embodiment, diaphragm 306 is fully supported by plate 194 and actuator housing 112. In particular, a solid member is in contact with substantially all of diaphragm 306 such that the solid members prevent diaphragm 306 from ballooning outward in response to pressure media. Plate 194 supports the underside of diaphragm 306 across the entire inner diameter of housing 112 over both the convex and concave surfaces of plate 194. The inner diameter surface 114 of housing 112 supports the sides of diaphragm 306.

When pressure media is injected into first pressure chamber 338 the pressure media exerts force against diaphragm 306 and plate 194 is moved to the plate-down position. In the plate-down position, there is an absence of unsupported areas of diaphragm 306. Diaphragm 306 does not extend axially past plate 194 when plate 194 is in the plate-up position or when plate 194 is in the plate-down position. The portion of diaphragm 306 that is inward from inner diameter surface 114 is supported by plate 194. Because diaphragm 306 is fully supported, it can withstand higher pressure in first pressure chamber 338 than an unsupported diaphragm could withstand. This embodiment can therefore have an actuator operating pressure higher than conventional unsupported diaphragms, which may be limited to 150 psig. Furthermore, diaphragm 306 can have an absence of fiber reinforcement and can be thinner than some conventional diaphragms.

Pressure chamber 330 is fluidly sealed at plate 194 by one of first plate seal assembly 336 and second plate seal assembly 340. Second plate seal assembly 340 can be formed by sidewall seal 218 sealingly engaging inner diameter surface 114 of housing 112 to provide a dynamic seal between inner diameter surface 114 and plate 194, and retainer seal 214 on an outer diameter surface of cylindrical body 236 sealingly engaging central bore 198 of plate 194. Retainer seal 214 circumscribes an outer diameter of seal nut 234 and is spaced axially apart from diaphragm 306.

Figure 4:
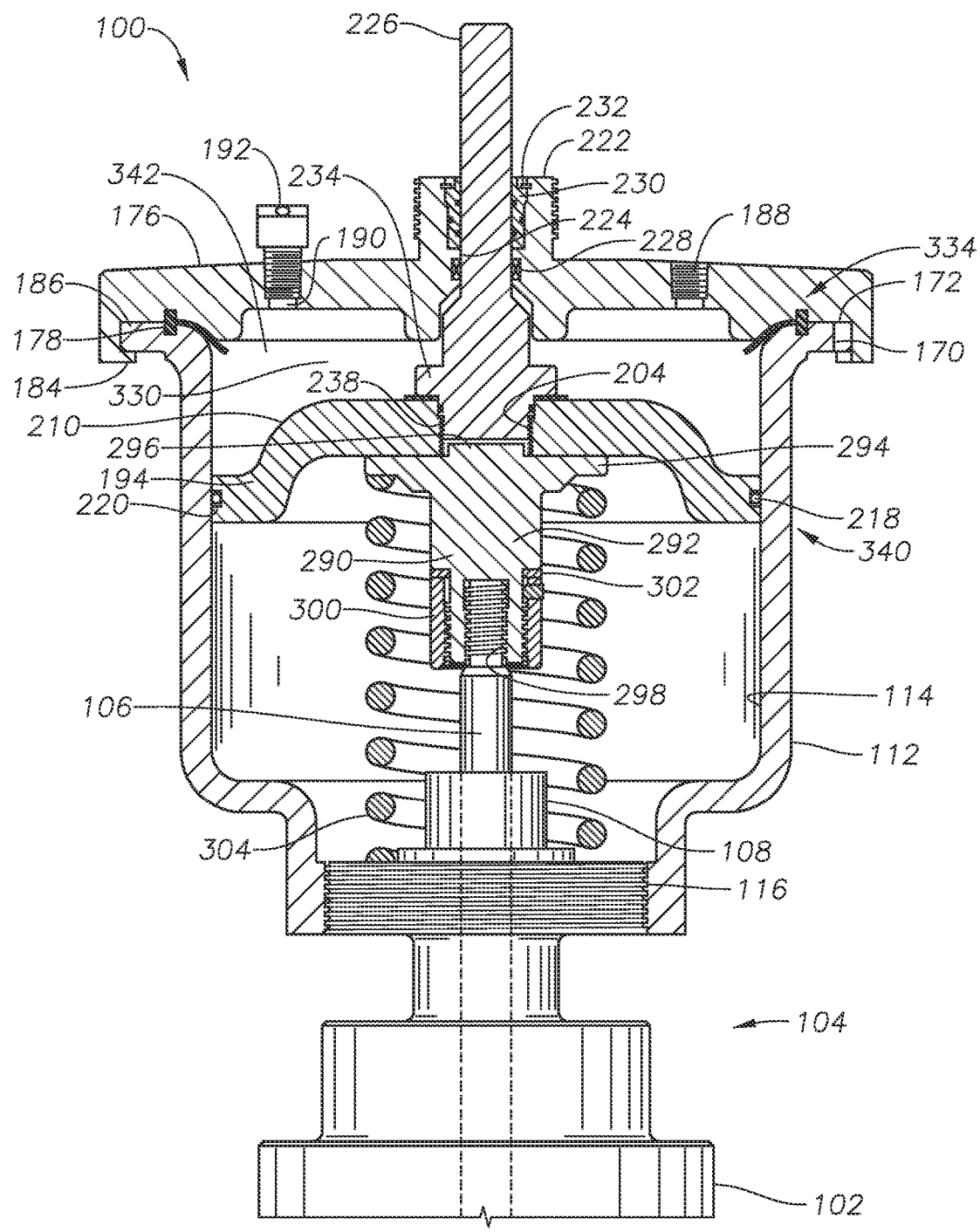
FIG. 4 is a side sectional view of a dual seal piston diaphragm actuator in accordance with an embodiment of this disclosure, showing a ruptured diaphragm and an outer diameter sidewall seal sealing the pressure chamber, and also showing a single piece support plate.

Embodiments of the current application provide a second pressure chamber 342. Second pressure chamber 342 can be a redundant secondary pressure chamber that will provide a fluidly sealed pressure chamber 330 to allow actuator 100 to continue to operate at full capacity if first pressure chamber 338 fails (FIG. 4). Looking at FIG. 4, second pressure chamber 342 can be defined by plate 194, actuator housing 112, and cap 176. Second pressure chamber 342 can include second plate seal assembly 340 that is formed by sidewall seal 218 sealingly engaging inner diameter surface 114 of housing 112 to provide a dynamic seal between inner diameter surface 114 and plate 194, and retainer seal 214 on an outer diameter surface of cylindrical body 236 sealingly engaging central bore 198 of plate 194. Second pressure chamber 342 will also have cap seal 334. Cap seal 334 can be formed by an outer diameter portion of diaphragm 306 located between upward facing surface 172 of housing flange 170 and downward facing surface 178 of cap 176, even if diaphragm 306 is ruptured. If first plate seal assembly 336 remains intact, retainer seal 214 will be redundant. Depending on the nature of the failure of first pressure chamber 338, either first plate seal assembly 336 or retainer seal 214 may provide a seal between seal nut 234 and plate 194 of the second pressure chamber 342.

Second pressure chamber 342 could alternately intentionally be used instead of first pressure chamber 338. Using the same components as previously described, actuator 100 can be assembled without diaphragm 306. The dual nature of the assembly allows operators to run the actuator as a piston actuator without maintaining a second set of valves and parts. To operate actuator 100 without diaphragm 306, a seal ring (not shown) can be positioned between housing 112 and cap 176. Sidewall seal 218 of plate 194 forms a seal against inner diameter surface 114, thus defining a pressure chamber without the use of a diaphragm. Pressure media injected through inlet 188 urges plate 194 downward, thus causing valve stem 106 to move downward.

To change the downforce exerted by actuator 100, outer plate 202 can be removed from hub 200 and an outer plate 202 having the same inner diameter, but a different outer diameter, can be installed on hub 200. Actuator housing 112 can be substituted for a housing having an inner diameter that corresponds to the outer diameter of the newly installed outer plate 202. Cap 176 is similarly replaced with a cap 176 with a size that corresponds to the newly installed housing 112. Finally, diaphragm 306 can be replaced with a new diaphragm 306 that is sized appropriately for the new outer plate 202, housing 112, and cap 176. Other components, such as seal nut 234, stem 226, and bonnet 104 do not need to be replaced when switching from one size to another.

Another alternate valve actuator system includes a first and second actuator assembly (not shown). The second actuator assembly can be axially aligned with the first actuator assembly. Each actuator assembly includes an actuator housing 112, plate 194, cap 176, and inlet 188. The first actuator assembly can be located axially above the second actuator assembly and can have a smaller diameter than the second actuator assembly. Specifically, the housing actuator housing 112, plate 194, and cap 176 can each have a smaller diameter than the same type of components in the second actuator assembly. In alternate embodiments, first and second actuator assembly can have a substantially similar diameter.

In operation, pressurized media is introduced through inlet 188 into pressure chamber 330. In the embodiment of FIG. 1, pressurized media enters first pressure chamber 338 and exerts downward force on diaphragm 306 and plate 194, which urges plate 194, down stop 290, and valve stem 106 downward to actuate valve 102.

Looking at FIG. 4, if diaphragm 306 fails, such as by rupturing, second pressure chamber 342 can take the place of first pressure chamber 338 and actuator 100 can continue to operate at capacity. Alternately, if diaphragm 306 leaks but is generally still intact and both cap seal 334 and first piston seal assembly 336 are functioning, an operator can inject sealant through a sealant injection port of device 192 so that the sealant comes into sealing contact with the damaged region of diaphragm 306 and first pressure chamber 338 is restored to working condition.

Figure 5:
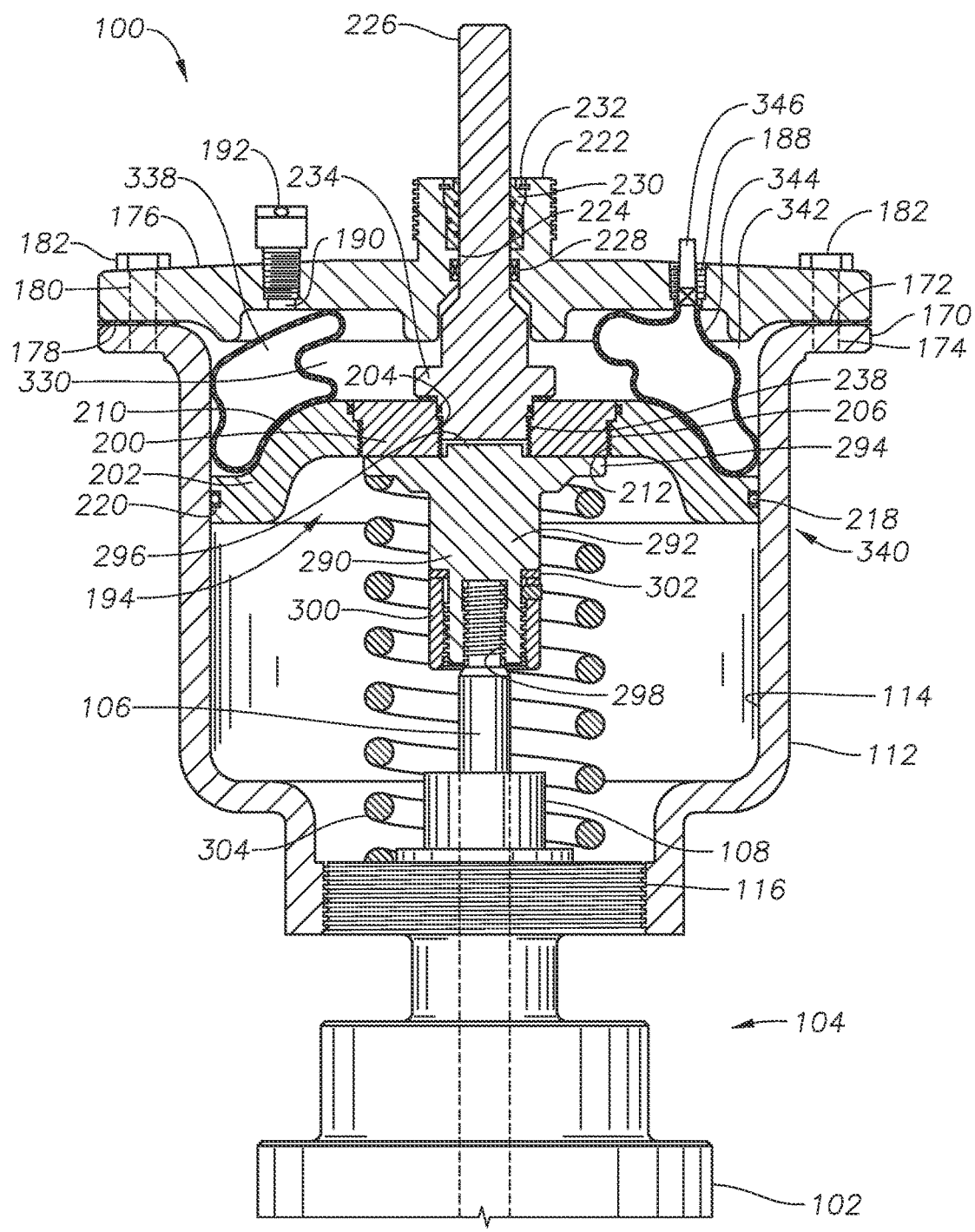
FIG. 5 is a side sectional view of the dual seal piston diaphragm actuator of FIG. 4, showing a replacement diaphragm sealing the pressure chamber.

Looking at FIG. 5, if diaphragm 306 fails, an operator can alternately install tubular diaphragm 344 to provide and alternate first pressure chamber 338. Tubular diaphragm 344 is a ring shaped tubular member with a valve stem 346. Tubular diaphragm can be positioned within actuator housing 112 between plate 194 and cap 176 and can circumscribe seal nut 234 and indicator stem 226. Valve stem 346 can extend through inlet 188 for the injection of pressure media into tubular diaphragm 344. With the addition of pressure media into tubular diaphragm 344, acting as first pressure chamber 338, tubular diaphragm 344 will inflate and exerts downward force on diaphragm 306 and plate 194.

While the invention has been shown or described in only some of its forms, it should be apparent to those skilled in the art that it is not so limited, but is susceptible to various changes without departing from the scope of the invention.

What is claimed is:

1. An apparatus for actuating a valve, the apparatus comprising:
   an actuator housing having a valve end, a cap end, a central axis, and a sidewall defining an inner diameter of the actuator housing;
   a cap connected to the cap end of the actuator housing;
   a plate positioned within the actuator housing, the plate having a center portion and an outer diameter that slidingly engages the inner diameter of the actuator housing;
   a pressure chamber located within the actuator housing between the plate and the cap, the plate moving between a plate-up position and a plate-down position in response to pressure media injected into the pressure chamber, the plate being nearer the valve end in the plate-down position than in the plate-up position;

a seal nut connected to the plate, the seal nut operable to engage a central opening of a diaphragm; and a cap seal fluidly sealing the pressure chamber between the cap and the actuator housing; wherein the pressure chamber is fluidly sealed at the plate by one of a first plate seal assembly and a second plate seal assembly; and wherein the first plate seal assembly is formed by the diaphragm being secured between the seal nut and the plate;

the second plate seal assembly is formed by an outer diameter sidewall seal located between the inner diameter of the actuator housing and the outer diameter of the plate and a retainer seal located between an outer diameter of the seal nut and an inner diameter of the plate; and wherein the diaphragm moves between a shortened position when the plate is in a plate-up position and the diaphragm has a bellows shape in cross section the bellows shape having at least one inner loop with an inner loop inner diameter and at least one outer loop having an outer loop outer diameter, and an extended position when the plate is in a plate-down position, by expanding the bellows shape axially and reducing a radial distance between the inner loop inner diameter and the outer loop outer diameter, measured relative to the central axis such that one or more of the at least one inner loops contacts the sidewall of the actuator housing, and wherein the at least one outer loop and the at least one inner loop are spaced axially apart.

2. The apparatus according to claim 1, wherein the first plate seal assembly and the second plate seal assembly are redundant seal assemblies fluidly sealing the pressure chamber.

3. The apparatus according to claim 1, wherein the retainer seal circumscribes the outer diameter of the seal nut and is spaced axially apart from the diaphragm.

4. The apparatus according to claim 1, wherein:
the diaphragm has a diaphragm lip circumscribing the central opening of the diaphragm;
the seal nut has a ring shaped nut lip; and
the first plate seal assembly is defined by the diaphragm lip retained by the nut lip.

5. The apparatus according to claim 1, wherein the diaphragm has an outer diameter portion, and wherein the cap seal includes the outer diameter portion of the diaphragm located between the cap and the actuator housing.

6. The apparatus according to claim 5, wherein the outer diameter portion has a ring shaped seal lip that engages an annular seal lip groove located between the cap and the actuator housing.

7. The apparatus according to claim 1, further comprising a sealant injection port extending into the pressure chamber, the sealant injection port selectively directing sealant into the pressure chamber and into sealing contact with a damaged region of the diaphragm.

8. The apparatus according to claim 1, wherein the cap is detachably connectable to the actuator housing by locating the cap on the actuator housing and rotating the cap from a released position to a locked position, the cap rotating less than one full revolution between the released and locked positions.

9. An apparatus for actuating a valve, the apparatus comprising:
an actuator housing having a valve end, a cap end, a central axis and a sidewall defining an inner diameter of the actuator housing;

a cap connected to the cap end of the actuator housing;

a plate positioned within the actuator housing, the plate having a center portion and an outer diameter that slidingly engages the inner diameter of the actuator housing;

a first pressure chamber and a second pressure chamber located within the actuator housing between the plate and the cap; wherein the first pressure chamber is defined at least in part by a diaphragm supported by the plate such that the diaphragm moves between a shortened position when the plate is in a plate-up position and the diaphragm has a bellows shape in cross section, the bellows shape having at least one inner loop with an inner loop inner diameter and at least one outer loop having an outer loop outer diameter, and an extended position when the plate is in a plate-down position, by expanding the bellows shape axially and reducing a radial distance between the inner loop inner diameter and the outer loop outer diameter, measured relative to the central axis such that one or more of the at least one inner loops contacts the sidewall of the actuator housing, and wherein the at least one outer loop and the at least one inner loop are spaced axially apart;

the second pressure chamber is defined by the plate, the actuator housing, and the cap, the second pressure chamber having a plate seal assembly including an outer diameter sidewall seal located between the inner diameter of the actuator housing and the outer diameter of the plate; and a fluidly sealed region between the cap and the plate is formed by at least one of the first pressure chamber and the second pressure chamber and the plate moves between the plate-up position and the plate-down position in response to pressure media injected into the fluidly sealed region, the plate being nearer the valve end in the plate-down position than in the plate-up position.

10. The apparatus according to claim 9, further comprising a cap seal fluidly sealing between the cap and the actuator housing.

11. The apparatus according to claim 10, wherein the diaphragm has an outer diameter portion, and wherein the cap seal includes the outer diameter portion of the diaphragm located between the cap and the actuator housing.

12. The apparatus according to claim 11, wherein the outer diameter portion of the diaphragm includes a seal lip and the cap seal comprises the seal lip being located in an annular seal lip groove located between the cap and the actuator housing.

13. The apparatus according to claim 9, wherein the first pressure chamber and the second pressure chamber are redundant pressure chambers fluidly sealing the fluidly sealed region.

14. The apparatus according to claim 9, further comprising a seal nut connected to the plate, the seal nut operable to engage a central opening of the diaphragm.

15. The apparatus according to claim 14, wherein the second pressure chamber includes a retainer seal that circumscribes an outer diameter of the seal nut and is spaced axially apart from the diaphragm.

16. The apparatus according to claim 14, wherein:
the diaphragm has a diaphragm lip circumscribing the central opening of the diaphragm;
the seal nut has a ring shaped nut lip; and
the first pressure chamber is defined at least in part by the diaphragm lip retained by the nut lip.

17. The apparatus according to claim 9, further comprising a sealant injection port extending into the first pressure chamber, the sealant injection port selectively directing sealant into the first pressure chamber and into sealing contact with a damaged region of the diaphragm.

18. The apparatus according to claim 9, wherein the cap is detachably connectable to the actuator housing by locating the cap on the actuator housing and rotating the cap from a released position to a locked position, the cap rotating less than one full revolution between the released and locked positions.

19. The apparatus according to claim 9, wherein the diaphragm does not extend axially past the plate in each of the plate-up and plate-down positions.

* * * * *